United States Patent [19]

Hancock

[11] Patent Number: 5,772,897
[45] Date of Patent: Jun. 30, 1998

[54] CONTINUOUS OXIDATION PROCESS USING A HYPOCHLORITE SOLUTION

[75] Inventor: Frederick Ernest Hancock, Stockton, United Kingdom

[73] Assignee: Imperial Chemical Industries PLC, United Kingdom

[21] Appl. No.: 716,271

[22] PCT Filed: Mar. 10, 1995

[86] PCT No.: PCT/GB95/00522

§ 371 Date: Dec. 23, 1996

§ 102(e) Date: Dec. 23, 1996

[87] PCT Pub. No.: WO95/26318

PCT Pub. Date: Oct. 5, 1995

[30] Foreign Application Priority Data

Mar. 28, 1994 [GB] United Kingdom ............ 9406117

[51] Int. Cl.[6] ........................................ C02F 1/76
[52] U.S. Cl. ..................... 210/756; 210/758; 210/763
[58] Field of Search ............................. 210/721, 756, 210/758, 763

[56] References Cited

U.S. PATENT DOCUMENTS

| 3,944,487 | 3/1976 | Davis et al. ............... 210/756 |
| 4,297,333 | 10/1981 | Crawford et al. .......... 210/756 |
| 4,764,286 | 8/1988 | Bon et al. ................. 210/763 |

FOREIGN PATENT DOCUMENTS

| 211530 | 2/1987 | European Pat. Off. . |
| 276044 | 7/1988 | European Pat. Off. . |
| 362429 | 4/1990 | European Pat. Off. . |
| 397342 | 11/1990 | European Pat. Off. . |
| 4118626 | 12/1992 | Germany . |
| 2307590 | 12/1990 | Japan . |
| 4243597 | 8/1992 | Japan . |

Primary Examiner—Jay H. Woo
Assistant Examiner—Betsey J. Morrison

[57] ABSTRACT

A process of continuous decomposition of oxidizable materials in aqueous media, e.g. pollutants in effluents, by catalytic reaction with an oxidant, e.g. hypochlorite or hydrogen peroxide, in aqueous solution using a fixed bed of a particulate catalyst of at least 1% of nickel or copper oxide, optionally plus a basic oxide, e.g. zinc oxide, on a porous support is disclosed.

7 Claims, No Drawings

CONTINUOUS OXIDATION PROCESS USING A HYPOCHLORITE SOLUTION

This invention relates to a catalytic oxidation process.

For environmental reasons it is often desirous to treat aqueous effluents in order to decompose contaminants such as organic compounds therein before discharge of the effluent, for example into rivers, estuaries, or the sea. In the present invention this decomposition is effected by oxidation.

U.S. Pat. No. 3,944,487 describes a discontinuous process for the treatment of waste water by digesting the waste water with sodium hypochlorite and then passing the so treated waste water through a catalytic filter bed of granular catalyst particles such as a mixture of nickel and cobalt oxides on a porous activated alumina support; the catalytic filter bed is then regenerated by incineration of pollutant particles trapped on the filter bed by passing air through the bed at high temperature.

A continuous process for the catalytic decomposition of an solution containing an oxidising agent, such as hypochlorite or hydrogen peroxide, has been proposed in EP-A-0 211 530. In the process of this reference, the solution is continuously passed through a fixed bed of catalyst comprising pieces of a non-porous inert material, such as alpha-alumina, supporting an intimate mixture of nickel oxide, and optionally cobalt oxide, and a minor amount of an oxide of a Group III element. The Group III oxide, e.g. alumina, in intimate mixture with the nickel oxide, promotes the activity of the nickel oxide for the decomposition of the oxidising agent. A similar process is disclosed in EP-A-0 276 044 where the catalyst is pieces of a non-porous inert material supporting an intimate mixture of nickel and Group IIA oxides. Those references also disclose that this procedure may be employed for the continuous decomposition of oxidisable materials such as organic pollutants in effluents by adding an aqueous solution of the oxidising agent to the effluent and then passing the mixture through the catalyst bed. The nickel oxide catalyses the decomposition of the oxidising agent, releasing oxygen which oxidises the oxidisable material.

We have found that where the catalysed decomposition of an oxidising agent using a fixed catalyst bed is employed to effect oxidation of oxidisable materials in aqueous media, a significant proportion of the available oxygen resulting from the decomposition of the oxidising agent is in fact released from the aqueous effluent as oxygen gas and so has not been utilised for oxidation of the oxidisable material. This represents a waste of oxidising agent. Furthermore, although the data quoted in the aforesaid EP-A-0 211 530 shows that a large proportion of the oxidisable material was removed from the aqueous medium, we have found that, where the oxidisable material is relatively volatile, it is probable t at a significant proportion of the oxidisable material is merely stripped from the aqueous medium by the evolved oxygen. Discharge of such evolved gas containing oxidisable materials is likewise undesirable. Hence it is desirable to minimise the amount of gas evolved, both from consideration of the economic aspects of wasting oxidising agent and from environmental considerations.

A convenient measure of the selectivity of the oxidation is the ratio of the amount of oxidising agent used for oxidation of the oxidisable material to the total amount of oxidising agent decomposed. In some cases the selectivity can be determined from measurement of the amount of oxidising agent decomposed and the amount of oxygen evolved from the aqueous medium. By analysis of the evolved gas, it is also possible to determine whether the oxidisable materials have simply been stripped from the aqueous medium into the gas phase. However, with catalysts of poor activity or of good selectivity, the rate of gas evolution may be too small to enable an accurate measurement to be obtained.

As mentioned above, the catalysts specified in the aforesaid EP-A-211 530 and EP-A-276 044 comprised an intimate mixture of nickel oxide (optionally plus cobalt oxide) and a minor amount of an oxide of a Group IIA or Group III metal, supported on a non-porous support. The Group IIA or Group III metal oxide promoted the activity of the nickel oxide for the decomposition of the oxidising agent.

We have found that in order to improve the selectivity, it is desirable to employ catalysts that have porous supports, for example having a pore volume of at least 0.1 ml/g, preferably at least 0.3 ml/g, and that have less activity for the decomposition of the oxidising agent.

Accordingly the present invention provides a continuous process for the oxidation of oxidisable materials in an aqueous medium comprising adding an oxidising agent to the aqueous medium and passing the mixture under alkaline conditions through a fixed bed of a particulate catalyst consisting essentially of i) 80–99% by weight of an inert porous support, ii) a total of at least 1% by weight of at least one material selected from oxides of copper and nickel, and iii) optionally at least one oxide of an element from Group II of the Periodic Table, said oxidising agent being one that, at least in the absence of said oxidisable material, is decomposed by said catalyst with the evolution of oxygen.

Preferably any time delay between addition of the oxidising agent and contact of the resultant mixture with the catalyst is kept to a minimum: particularly it is preferred that any such time delay is less than 5 minutes, more particularly less than 1 minute.

Oxidants that may be employed include ozone, hydrogen peroxide, and, particularly, hypochlorite solutions.

In the present invention the catalyst is copper and/or nickel oxides on a porous support, which of course should be able to withstand the process conditions, e.g. the alkalinity at which the process is operated. It is preferred that the process is operated under relatively mild alkalinity, e.g. pH 7.5–11.5, and, under such conditions, supports comprising alumina, silica, magnesia, magnesia/alumina spinel, or calcium aluminate may be employed. A particularly suitable support material is gamma alumina in the form of porous granules having a pore volume of at least 0.3 ml/g. The catalyst should be free of other materials that exert catalytic activity for the decomposition of the oxidising agent, or might act as activity promoters for the copper or nickel. In particular oxides, or other compounds, of elements such as cobalt, iron, chromium, manganese, and platinum group metals, should be absent except possibly in the trace amounts sometimes present in commercial sources of the active materials.

The catalysts of the invention may optionally contain one or more Group II oxides. The Group II oxide may be magnesium oxide, but is preferably a Group IIB oxide, particularly zinc oxide. Preferably such materials, if employed, are present in relatively minor amounts such that the total number of copper and nickel atoms is at least 4 times the total number of Group II element atoms. Where the active component of the catalyst is nickel oxide, it is preferred that the catalyst does not contain zinc or magnesium oxides. However, such components are in some cases beneficial where the active component is copper oxide. Preferably the total amount of nickel and copper oxides is in the range 5 to 15% by weight of the catalyst particles.

The catalyst particles may be made by impregnating particles of the support having a suitable shape, e.g. rings, or granules, with a solution of salts of the appropriate metal, i.e. nickel and/or copper and optionally one or more Group II metals such as zinc or magnesium, followed by calcination of the impregnated shaped support in air. The metal salts should be selected such that they decompose to the appropriate oxide on heating in air. Nitrates or salts of organic acids are generally suitable. The catalyst particles preferably have an average minimum dimension in the range 0.5 mm to 5 mm, and an average maximum dimension in the range 0.5 mm to 10 mm.

During use some of the oxide components of the catalyst may become hydrated and in some cases the active material may be oxidised to a valency state, e.g. $Ni_2O_3$, that is higher than that of the oxides, e.g. NiO, formed by normal routes involving calcination of a precursor in air: the aforementioned compositions and proportions refer to the catalysts with the components in their normal valency state and before such hydration.

The oxidising agent is preferably a hypochlorite, and the treatment effected at a pH in the range 7 to 14, especially 7.5 to 11.5. The optimum proportion of oxidising agent relative to the oxidisable material is best determined experimentally. The theoretical amount of oxidising agent required for complete oxidation of an oxidisable material can be calculated. Thus if the oxidisable material is an organic compound having the empirical formula $C_xH_{2y}O_z$, the stoichiometric amount of hypochlorite as an oxidant is given by the equation $$qOCl^- + C_xH_{2y}O_z \rightarrow xCO_2 + yH_2O + qCl^-$$

where $q = 2x + y - z$.

In the present invention the stoichiometric amount is considered to be the amount of oxidant required to oxidise the carbon and hydrogen in the oxidisable material to carbon dioxide and water. Thus the amount of oxidant required for oxidation of other elements present is ignored, and it is assumed that any oxygen associated with those other elements in the oxidisable material is unavailable for oxidation of the carbon and hydrogen. As an example, if the oxidation of o-nitrophenol, $C_6H_4(NO_2)OH$, is considered, the oxygen of the nitro group is ignored, so that the amount of oxygen required is 12 atoms to oxidise the 6 atoms of carbon to carbon dioxide and 2.5 atoms to oxidise the 5 atoms of hydrogen to water. However, since there is one oxygen atom in o-nitrophenol not associated with the nitrogen atom, only 13.5 atoms of oxygen need to be supplied by the oxidant. Thus 1 mole (137 g) of nitrophenol would require 13.5 moles of sodium hypochlorite (about 1006 g) or hydrogen peroxide (459 g). Nitrogen in the oxidisable material may in fact be oxidised to $N_2$ or nitrate depending upon the conditions employed. Other elements in the oxidisable material e.g. halogen, sulphur, may be oxidised to the corresponding anion e.g. chloride, sulphite, sulphate etc.

Such a theoretical amount of oxidant should only be taken as a starting point for experimental determination of the optimum amount since, on the one hand, even with the catalysts of the invention, some oxygen is liable to be evolved, representing a waste of oxidant and on the other hand, complete oxidation may not be necessary to achieve an aqueous effluent of the desired quality. Preferably the amount of oxidant employed is 0.3 to 1.5 times, particularly not more than 1.3 times, the stoichiometric amount. It will further be appreciated that where the aqueous medium to be treated contains a mixture of oxidisable materials or variable nature of proportions, it may not be possible to calculate the stoichiometric amount of oxidant.

Since the oxidation of organic oxidisable materials results in the formation of carbon dioxide, the medium should be sufficiently alkaline for the carbon dioxide produced to be retained in solution as carbonate by reaction with alkali present. As a result, the pH of the effluent from the process tends to be slightly less than that of the inlet medium. If insufficient alkali is present, not only may the carbon dioxide be evolved as gas, with the risk of entraining unreacted oxidisable materials therein, but also there is a risk that the catalyst may be leached from the support and appear in the effluent. It is for this reason that the aqueous inlet medium, after addition of the oxidising agent, has a pH in the range 7.5 to 11.5.

The oxidation process of the invention can also be used to effect decolourisation of aqueous effluents containing coloured organic compounds, such as dyestuff residues, e.g. spent dye bath liquors or wash liquors. Thus environmental regulations often require that effluents are decolourised before discharge into waterways. It is often not necessary to effect complete oxidation of the coloured materials, e.g. to carbon dioxide, and so the amount of oxidant required where it is only desired to effect decolourisation may likewise be less than the stoichiometric amount required for complete oxidation.

The process of the invention is conveniently operated with the catalyst disposed in one or more vertically disposed beds through which the aqueous medium being treated is passed. The flow through the beds may simply be under the action of gravity or may be assisted by means of a suitable pump to overcome the pressure drop through the bed at the desired flow rate. To avoid wastage of the oxidant, the oxidant should be added just before the mixture contacts the catalyst bed. With hypochlorite as the oxidant, this also has the advantage that undesired chlorination side reactions can be minimised. Indeed, in some cases it may be desirable to inject the oxidant into the catalyst bed, i.e. so that the aqueous medium is already in contact with the catalyst when it mixes with the oxidant.

The process of the invention may be utilised in the process of our PCT application WO 94111091 wherein odoriferous substances are scrubbed from a gas, such as air, into an aqueous hypochlorite solution which is then passed through a catalyst bed to effect decomposition of the odoriferous substances prior to recycle of the remaining hypochlorite solution, together with fresh hypochlorite, to the scrubbing duty.

The aqueous medium and/or the oxidant should be heated as necessary, preferably before mixing, so that the mixture has the desired inlet temperature, which is generally in the range 20°–80° C. Generally the activity of the catalyst increases with increasing temperature but often the selectivity decreases as the temperature is increased. Accordingly it is generally desirable to employ as low an inlet temperature as is consistent with achieving the desired level of decomposition of the oxidisable material.

The invention is illustrated by the following examples.

EXAMPLE 1

In this example, the catalyst support was gamma alumina spheres of approximately 2 mm diameter that had been calcined in air at 450° C. for 4 hours. The calcined spheres had a surface area of about 200 $m^2$/g and a porosity of about 0.3 ml/g. A catalyst was made by impregnating samples of the support with nickel oxide by dipping the support in a nickel nitrate solution, draining off the excess solution, and followed by calcining at 450° C. to convert the nickel nitrate to nickel oxide. The dipping, draining and calcining procedure was repeated several times to give a catalyst (Catalyst A) having a nickel oxide content of 10% by weight. For comparative purposes a blank (Catalyst B) in the form of a sample of the calcined alumina spheres that had not been impregnated was also tested.

EXAMPLE 2 (comparative)

By way of comparison a catalyst was made by the procedure of Example 1 but using as the impregnating solution a solution containing nickel and cobalt nitrates. The resulting catalyst (Catalyst C) contained 19% by weight of a mixture of nickel and cobalt oxides having a Ni:Co atomic ratio of 2.

Also by way of comparison a catalyst was made by dipping non-porous alpha alumina chips (having a pore volume much less than 0.1 ml/g) of size 1–2 mm in an aqueous solution containing nickel and aluminium nitrates, followed by draining off the excess of solution, and calcining at 450° C. for 6 hours. The dipping, draining, and calcination procedure was repeated twice to give a catalyst (Catalyst D) containing 3% by weight of an intimate mixture of nickel oxide and alumina having a Ni/Al atomic ratio of about 19 supported on non-porous alpha-alumina chips.

EXAMPLE 3

The procedure of Example 1 was repeated but using a copper nitrate solution in place of the nickel nitrate solution. The impregnated catalyst (Catalyst E) contained 19% by weight of copper oxide. A similar catalyst was made using fewer dipping stages to obtain a catalyst (Catalyst F) containing 5% by weight of copper oxide.

EXAMPLE 4

Example 3 was repeated using a solution containing copper and zinc nitrates for the impregnation to give an impregnated catalyst (Catalyst G) containing 18.3% by weight of copper and zinc oxides with a copper to zinc atomic ratio of 20.

The performance of the catalysts was assessed by using the catalysts for the continuous catalytic decomposition of benzoic acid with hypochlorite. 50 ml of the catalyst particles were disposed as a bed in a vertical tube of inside diameter 2.5 cm. An aqueous solution of sodium hypochlorite was continually added to an aqueous benzoic acid solution and the mixture, which had a pH of about 10, was heated to 40° C. and continually passed downwards through the catalyst bed at a flow rate in the range 30–40 mil/hr. The residence time of the mixture after mixing but before entering the catalyst bed was about 2 minutes.

In order that an assessment of the relative performances of the catalysts could readily be made, the proportions of hypochlorite and benzoic acid employed were deliberately chosen such that only a minor proportion of the benzoic acid would be oxidised: thus the concentrations and relative proportions of the benzoic acid and hypochlorite solutions were such that the feed to the catalyst contained approximately 1000 ppm by weight of benzoic acid and approximately 3000 ppm by weight of sodium hypochlorite, except in the case of the blank (Catalyst B), where a higher hypochlorite concentration was used, viz. approximately 5000 ppm. The stoichiometric amount of sodium hypochlorite required to oxidise 1000 ppm by weight of benzoic acid is about 9160 ppm.

The flow was continued for 48 hours to allow the system to stabilise and then samples of the influent and effluent were taken for analysis. The performance of the catalysts is shown in the following table. In this table, conversion is defined as the proportion of benzoic acid decomposed, and selectivity is defined as the proportion of the total hypochlorite decomposed that is used for oxidising the benzoic acid, assuming that the oxidation is in accordance with the equation $$C_6H_5COOH + 15\ NaOCl \rightarrow 7\ CO_2 + 3H_2O + 15\ NaCl$$

| Catalyst | NaOCl (ppm) in | NaOCl (ppm) out | Benzoic acid (ppm) in | Benzoic acid (ppm) out | Conversion (%) | Selectivity (%) |
|---|---|---|---|---|---|---|
| A Ni | 3250 | 0 | 851 | 692 | 19 | 45 |
| B blank | 5190 | 5140 | 972 | 971 | <1 | 18 |
| C Ni/Co | 3040 | 0 | 980 | 960 | 2 | 6 |
| D Ni/Al | 3260 | 0 | 882 | 875 | <1 | 2 |
| E Cu | 3170 | 0 | 930 | 740 | 20 | 55 |
| G Cu/Zn | 2820 | 0 | 1012 | 793 | 22 | 71 |

It is seen that the catalysts in accordance with the invention, i.e. catalysts A, E and G, each gave a conversion of about 20% and a good selectivity, whereas catalysts C and D had a poor performance, giving only a low conversion and selectivity. The rate of evolution of gas from the bed gave a corresponding qualitative assessment of the relative performances of the catalysts but, because of the difficulty of accurate measurement of the low rates of gas evolution in the cases of catalysts A, B, E and G, did not give a quantitative correlation with the above results. Significant quantities of gas were evolved when using catalysts C and D indicating that the hypochlorite was largely being decomposed to form oxygen which was not utilised for oxidation of the benzoic acid.

Some of the above catalysts were also tested for the decomposition of o-nitrophenol by a similar technique to that employed for benzoic acid, but using 40 ml of the catalyst and a flow rate of 28–30 ml/hr. In each test the temperature was 40° C., the pH was about 11 and the amount of o-nitrophenol was 500 ppm by weight. The amount of sodium hypochlorite employed was between 3300 and 4600 ppm by weight, which is about 90–125% of the stoichiometric amount required for complete oxidation of the carbon and hydrogen in the o-nitrophenol to carbon dioxide and water. By measuring the total organic carbon content of the aqueous medium leaving the catalyst bed, the proportion of o-nitrophenol converted to carbon dioxide and water was calculated and is quoted in the following table as the "conversion". The oxygen evolution rate was also measured. Aqueous solutions of o-nitrophenol are coloured. The oxidation by hypochlorite also effects decolourisation of the o-nitrophenol solution. This was assessed by measuring the optical density at a wavelength of 420 nm of the inlet and outlet solutions.

| Catalyst | Conversion (%) | $O_2$ evolution (ml/hr) | Optical density ($cm^{-1}$) inlet | Optical density ($cm^{-1}$) outlet |
|---|---|---|---|---|
| A Ni | 94 | 8.5 | 11.3 | 0.018 |
| C Ni/Co | 64 | 10.8 | — | — |
| D Ni/Al | 53 | 15.2 | 7.7 | 0.205 |
| E Cu (19% CuO) | 96 | 9.2 | 6.3 | 0.004 |
| F Cu (5% CuO) | 100 | 7.3 | 7.7 | 0.007 |

It is seen that the catalysts of the invention, (catalysts A, E and F) give higher conversions than the prior art catalysts C and D, and are also more selective since smaller quantities of oxygen were evolved. It is seen that the catalysts of the invention, particularly the copper catalysts, were effective in decolourising the aqueous medium.

The above o-nitrophenol oxidation was repeated using hydrogen peroxide as the oxidant. The amount of hydrogen peroxide employed was about 0.3 ml per 100 ml of the o-nitrophenol containing medium, and the pH employed was about 8–8.5. In this case the optical density was measured at a wavelength of 350 nm.

| Catalyst | Conversion (%) | $O_2$ evolution (ml/hr) | Optical density ($cm^{-1}$) | |
|---|---|---|---|---|
| | | | inlet | outlet |
| A Ni | 72.0 | 9.1 | 4.8 | 0.123 |
| C Ni/Co | 83.0 | 36.8 | — | — |
| D Ni/Al | 11.0 | 0.8 | 4.5 | 0.224 |
| F Cu (5% CuO) | 93.0 | 30.0 | 4.9 | 0.002 |

It is seen that the copper catalyst F was more active than the nickel catalysts while the nickel catalyst of the invention, (Catalyst A), although less active than the nickel/cobalt catalyst C, was far more selective. Again the copper catalyst F was particularly effective at decolourisation.

Catalyst F was also used for decolourising an aqueous medium containing a reactive sulphonated diazo bi-naphthol dyestuff by passing a solution containing the dyestuff and about 1000 ppm by weight of sodium hypochlorite at 40° C. at a space velocity of about 1 $hr^-$ and pH 9 through a bed of the catalyst. The optical densities at a wavelength of 400 nm of the inlet and outlet aqueous media were 0.72 $cm^{-1}$ and 0.027 $cm^{-1}$ respectively.

I claim:

1. A continuous process for the oxidation of oxidizable materials in an aqueous medium comprising adding a hypochlorite solution to an aqueous medium containing at least 500 ppm by weight of oxidizable material and passing the mixture under alkaline conditions through a fixed bed of a particulate catalyst consisting essentially of i) 80–99% by weight of an inert porous support, and ii) a total of at least 1% by weight of an oxidic material selected from nickel oxide, copper oxide, a mixture of nickel and copper oxides, and a mixture of copper oxide and zinc oxide.

2. A process according to claim 1 wherein the oxidizing agent is added to the aqueous medium less than 5 minutes before the mixture contacts the catalyst.

3. A process according to claim 1 wherein the process is operated at a pH in the range 7.5–11.5.

4. A process according to claim 3 wherein the support comprises alumina, silica, magnesia, magnesia/alumina spinel, or calcium aluminate.

5. A process according claim 1 wherein the catalyst comprises a mixture of nickel and copper oxides and the total amount of nickel and copper oxides is in the range 5 to 15% by weight of the catalyst particles.

6. A process according to claim 1 wherein the catalyst comprises the support and a mixture of copper oxide and zinc oxide in such proportions that the total number of copper atoms in the catalyst is at least 4 times the total number of zinc atoms.

7. A process according to claim 1 wherein the amount of hypochlorite added is 0.3 to 1.3 times the stoichiometric amount required for complete oxidation of carbon and hydrogen in the oxidizable material to carbon dioxide and water respectively.

* * * * *